United States Patent [19]

Riding et al.

[11] Patent Number: 4,866,219
[45] Date of Patent: Sep. 12, 1989

[54] MODULAR ENCODER AND SWITCH ASSEMBLY

[75] Inventors: Kim D. Riding, Hyrum; James W. Betz; James E. Templeton, both of Ogden, all of Utah

[73] Assignee: Bourns, Inc., Riverside, Calif.

[21] Appl. No.: 190,544

[22] Filed: May 5, 1988

[51] Int. Cl.[4] ...................... H01H 21/62; H05K 7/00
[52] U.S. Cl. .................................... 200/4; 200/11 G; 200/11 K; 200/11 TW; 361/393; 361/396
[58] Field of Search ............. 200/4, 5 R, 11 G, 11 D, 200/11 K, 11 TW, 17 R, 18, 50 C, 155 R, 156, 159 R, 307, 329, 336, 340; 338/130, 132, 172, 198; 361/392–396, 399, 417, 419–420

[56] References Cited

U.S. PATENT DOCUMENTS

| | | | |
|---|---|---|---|
| 3,598,945 | 8/1971 | Matsui et al. | 338/172 |
| 4,146,758 | 2/1979 | Hiwatahi et al. | 200/11 DA |
| 4,166,200 | 8/1979 | Reichen et al. | 200/11 R |
| 4,518,832 | 5/1985 | Geremia | 200/4 |
| 4,599,605 | 7/1986 | Froeb et al. | 340/347 P |

*Primary Examiner*—Gregory D. Thompson
*Attorney, Agent, or Firm*—Howard J. Klein; William G. Becker

[57] ABSTRACT

A modular encoder and switch assembly includes a first module containing the rotor and contact elements of an electrical encoder, and a second module that contains a switch. The two modules are axially aligned and joined together in tandem. The encoder and the switch are actuated by a common shaft that is rotatable to actuate the encoder and movable axially to actuate the switch.

14 Claims, 2 Drawing Sheets

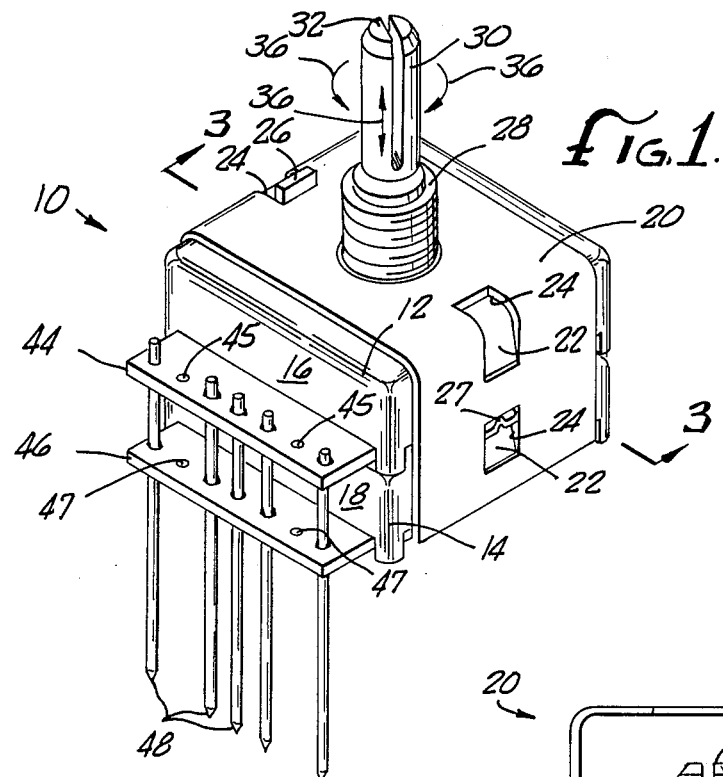
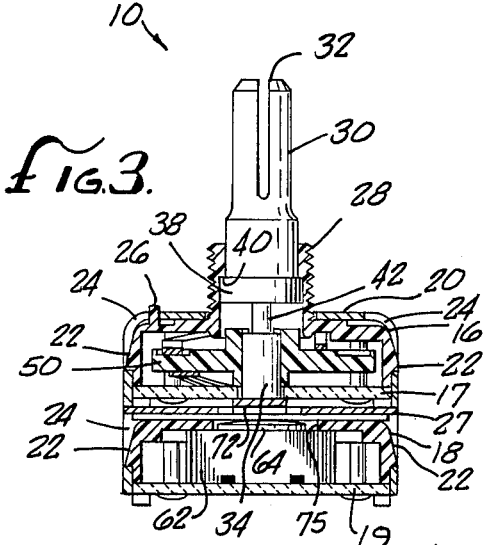
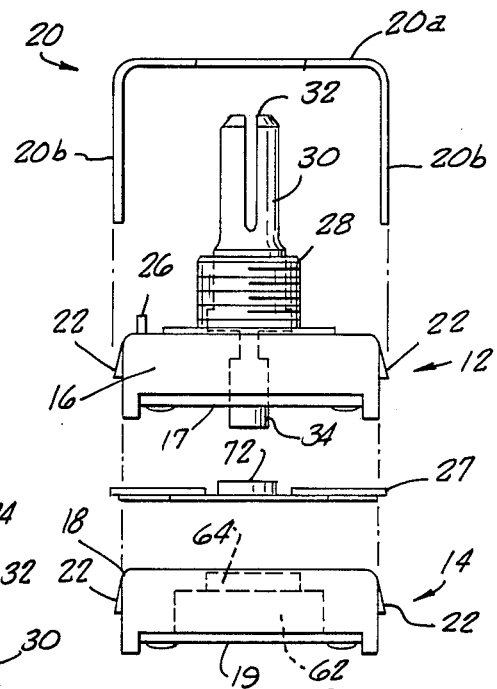
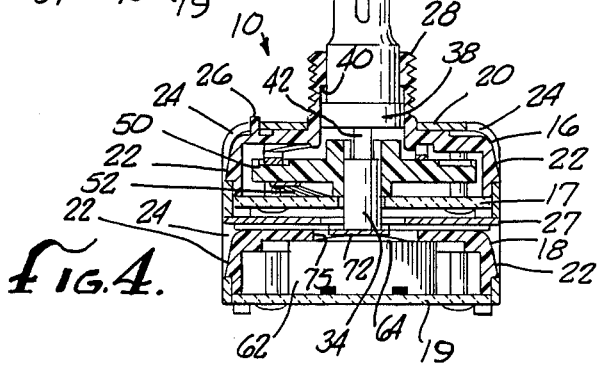

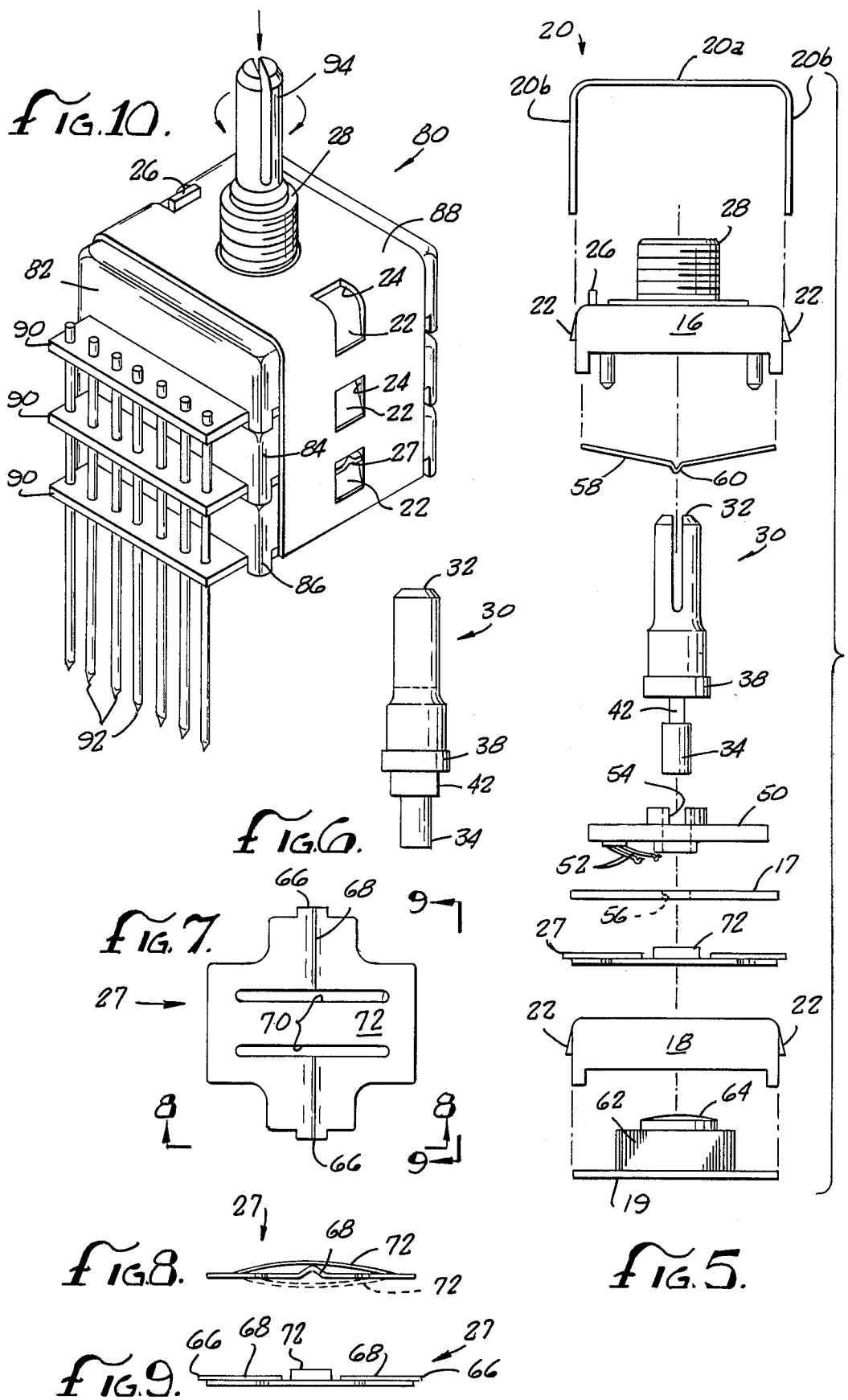

MODULAR ENCODER AND SWITCH ASSEMBLY

BACKGROUND OF THE INVENTION

The present invention relates generally to the field of rotary electrical encoders. More particularly, it relates to a modular encoder and an integral switch wherein the encoder and the switch are actuated by a common shaft.

Rotary electrical encoders are well-known in the art, as exemplified by U.S. Pat. No. 4,599,605 to Froeb et al. Such devices typically include a housing that encloses a substrate having a conductive pattern formed thereon to define a preselected digital signal, in the form of a pulse train or the like. A rotor, rotated by a shaft, carries a rotating contact element that contacts the conductive pattern as the rotor is rotated to generate an electrical signal having the digital characteristics defined by the conductive pattern on the substrate.

In many electronic applications, space-saving considerations are of great importance. One approach to minimizing circuit board space requirements has been the combining of several components in a single housing, particularly in tandem relationships.

This approach has been taken, for example, in U.S. Pat. No. 4,146,758 to Hiwatahi, et al., which discloses a rotary switch having a rotor that is axially movable between two sets of stationary contacts contained in one housing.

A variation on the above described space-saving scheme is the use of stacked, modular components. U.S. Pat. No. 4,166,200 to Reichen et al., for example, discloses a modular rotary switch assembly comprising a pair of rotary switches joined together so as to be operable, either independently, or simultanenously, by a pair of concentric shafts. U.S. Pat. No. 4,518,832 to Geremia discloses a switch assembly comprising a plurality of stacked, modular switch sections, including, both rotary switches and push-pull switches, all actuated by a common central shaft.

The prior art discussed above has demonstrated the successful combination of multiple components that are functionally similar. Nevertheless, further refinements, in terms of compactness, economy of manufacture, and reliability, are in constant demand.

SUMMARY OF THE INVENTION

Broadly, the present invention is a modular encoder and switch assembly comprising a first module containing the rotor and contact elements of an electrical encoder, and a second module, mounted coaxially and in tandem with the first module, and containing a switch. The encoder and the switch are actuated by a common shaft that is rotatable to actuate the encoder, and movable axially to actuate the switch.

In a specific preferred embodiment, the switch is a push-button momentary contact switch, that is engaged by the inner end of the shaft, whereby the push-button contact is urged against a fixed contact on a substrate in the second module.

In other embodiments, the switch may be a rotary switch or a maintained-contact push-button switch. In still other embodiments, the second module may contain a second rotary encoder, and a third module may contain a switch. The encoders and the switch may share a single shaft that selectively actuates a component depending upon the axial position of the shaft, or there may be two concentric shafts for selectively actuating the components independently or in common.

All of the embodiments employ parallel terminal bus bars to reduce the number of electrical connections needed to interface the modular components with external circuitry.

BRIEF DESCRIPTION OF THE DRAWINGS

FIG. 1 is a perspective view of a preferred embodiment of the present invention;

FIG. 2 a partially exploded rear elevational view of the device of FIG. 1;

FIG. 3 is a cross-sectional view along line 3—3 of FIG. 1, showing the switch in the device in its open position;

FIG. 4 is a view similar to that of FIG. 3, but showing the switch in its closed position;

FIG. 5 is an exploded rear elevational view of the device of FIG. 1, showing the elements of the encoder in the device;

FIG. 6 is a side elevational view of the actuation shaft used in the device of FIG. 1;

FIG. 7 is a top plan view of the leaf spring used in the device of FIG. 1;

FIG. 8 is a side elevational view of the leaf spring of FIG. 7, taken along line 8—8 of FIG. 7;

FIG. 9 is a side elevational view of the leaf spring of FIG. 7, taken along line 9—9 of FIG. 7; and FIG. 10 is a perspective view of a modification of the preferred embodiment of the present invention.

DETAILED DESCRIPTION OF THE INVENTION

Referring to the drawings, a modular encoder and switch assembly 10, in accordance with a preferred embodiment of the present invention, will be described in detail.

The modular assembly 10 comprises two or more sub-assemblies mounted together in the manner described below. In the preferred embodiment illustrated in FIGS. 1–5, the modular assembly 10 includes a first or upper module 12 and a second or lower module 14. The upper module 12 comprises a first or upper cover 16 and a first or upper substrate 17. The lower module 14 comprises a second, or lower cover 18 and a second or lower substrate 19. The modules 12 and 14 are mounted in tandem with the top surface of the lower cover 18 adjacent to the bottom surface of the upper substrate 17. A bracket 20, having a top portion 20a and two downwardly depending opposed side portions 20b, engages the top surface of the upper cover 16 and two opposed sides of both covers (as shown in FIGS. 1 and 2) to hold the two modules together. The upper and lower covers 16 and 18 are each provided with a pair of outwardly-tapered tabs 22, one on each of two opposed sides of each cover. Each of the tabs 22 is lockably received in a slot 24 in one side of the side portions 20b of the bracket 20, thereby locking the bracket 20 and the two modules together. An upwardly-extending locating tab 26 is advantageously provided in the top surface of the upper cover 16, for engagement in one of the slots 24, to provide a more secure locking. Captured between the upper and lower modules is a leaf spring 27, to be described below.

Extending upwardly from the upper cover 16 is a hollow cylindrical fitting 28, which, preferably, is externally threaded for attachment to a console or the like (not shown). The fitting receives an actuation shaft 30, having a slotted outer end 32 that extends outwardly from the fitting 28, and a cylindrical inner end 34 that extends through the upper cover 16, and the upper substrate 17. The shaft 30 is mounted for both rotation and axial movement, as indicated by the arrows 36 in FIG. 1. The intermediate portion of the shaft 30 has a peripheral flange 38 that normally seats against an annular shoulder 40 in the interior of the fitting 28, as shown in FIGS. 3 and 4. The cylindrical inner end 34 of the shaft 30 is connected to the flanged portion 38 by a flattened portion 42.

As shown in FIG. 1, an upper bus bar 44, with a first plurality of apertures 45, and a lower bus bar 46 with a second plurality of apertures 47, are attached to the same side of the upper and lower covers, respectively, so as to be parallel to one another. The apertures 45 are in vertical alignment with the apertures 47 for receiving a plurality of terminal pins 48, the number of pins 48 being determined by the specific functions of the components contained within the upper and lower modules, as will be described below.

In the preferred embodiment shown in the drawings, the upper module contains an encoder and the lower module contains a push-button switch. As shown in FIGS. 3 and 4 and particularly FIG. 5, the encoder is of substantially conventional design, having a rotor 50 with a plurality of electrical contact fingers 52 attached to its lower surface. The contact fingers make electrical contact with conductive elements (not shown) formed on the upper surface of the upper substrate 17 in a pattern that results in a predetermined electrical signal being generated as the rotor 50 is rotated. The rotor 50 has a central keyway 54 that mates with the flattened portion 42 of the shaft 30, allowing the rotor 50 to be rotated by means of the shaft. The cylindrical inner portion 34 of the shaft extends through the rotor 50 and through a central aperture 56 in the upper substrate 17.

The encoder advantageously includes an approximately annular-detent spring 58 that is seated in a recess (not shown) in the interior of the upper cover 16. The detent spring has at least one resilient finger or protuberance 60 that engages a plurality of radial teeth (not shown) on the upper surface of the rotor 50 to provide a multiplicity of detented rotor positions.

The lower module, in the illustrated embodiment, contains a push-button switch 62. In this particular embodiment, the switch 62 is of the momentary contact type, that is well-known in the art. The switch 62 includes a push-button 64 that carries a moveable contact (not shown) and brings it into engagement with a fixed contact (not shown) on the lower substrate 19. The push-button 64 is spring-biased in the open contact position, thereby providing momentary contact function.

As previously mentioned, a leaf spring 27 is captured between the upper and lower housings. This leaf spring, of novel design, is illustrated in FIGS. 7, 8 and 9. As shown, the leaf spring is substantially cruciform in outline, with two of the opposed arms each terminating in a tab 66. The two tabs 66 define an axis, along which the spring is bent to form an inverted V-shaped ridge 68. The tabs 66 are engaged in two of the opposed slots 24 in the bracket 20, as shown in FIG. 1, to secure the spring 27 in place.

Traversing the axial ridge 68 are a pair of parallel slots 70 which define a resilient center section 72. The center section 72 is normally bowed upwardly, as shown in FIG. 8, to provide a yieldable, resilient, upwardly-biased spring action. The inner end 34 of the shaft 30 abuts against the center section 72, as shown in FIG. 3 and 4.

The operation of the encoder and switch assembly 10 is shown in FIGS. 1, 3 and 4. Specifically, the shaft 30, as previously mentioned, is both rotatable and movable axially. The axially movement is between first and second axial positions. In the first axial position, the shaft 30 is biased upwardly by the leaf spring center section 72, as shown in FIG. 3, with the peripheral flange 38 seated against the shoulder 40. The shaft is thus disengaged from the push-button 64, while being free to be rotated to actuate the encoder by rotating the rotor 50.

When the shaft is moved downwardly or inwardly, as indicated by the arrow 74 in FIG. 4, its inner end 34 urges the leaf spring center section 72 downwardly through a central aperture 75 in the top surface of the bottom cover 18. The center section 72 is thus brought into operable engagement with the push-button 64 of the switch, thereby actuating the push-button to close the switch contacts. When the shaft has been pushed downwardly into this second axial position, it is also free to rotate to operate the encoder. The resilience of the axial spring center section 72 urges the shaft upwardly to its first axial position when pressure is released from the shaft.

The leaf spring 27 provides improved tactile "feel" when the shaft 30 is moved axially to actuate the switch. Also, the spring 27 provides an improved action of switch-opening with a stronger spring bias than is present in many push-button switches. With some switches, however, such enhanced feel or spring action may be unnecessary or undesirable. In such cases, it may be desirable to omit the leaf spring 27.

FIG. 10 illustrates another modular encoder and switch assembly 80 that represents a modification of the preferred embodiment of the invention described above. This assembly comprises three modules: a first, or upper module 82, a second, or middle module 84, and a third or lower module 86. Each of the modules 82, 84 and 86 is formed of a cover and a substrate, as in the previously-described embodiment. The three modules 82, 84 and 86 are joined together, as in the two-module embodiment, by a bracket 88, that is similar in construction to the bracket 20 shown in FIG. 1. Each of the three modules has a bus bar 90 extending from the same side, with the holes in all three parallel bus bars in vertical alignment to accommodate a plurality of terminal pins 92.

The three modules of the FIG. 10 device enclose two encoders and a switch, the switch being contained in the lower module 86. This embodiment includes a shaft 94 that is similar to the shaft 30 of the FIG. 1 embodiment, but obviously longer. The shaft 94 is movable both axially and rotationally. It has a first axial position in which the encoders can be operated by rotation of the shaft, and a second axial position in which the switch is actuated in manner similar to that described above for the FIG. 1 embodiment. A simple modification would allow the shaft to have three axial positions: a first position for operating the encoder in the upper module 82, a second position for separately operating the encoder in the middle module 84, and a third position for actuating the switch.

Another modification would allow the two encoders to be independently actuable by a pair of concentric shafts. Still another modification would be to have a potentiometer in one of the modules, particularly the upper module 82 or the middle module 84.

The above-described invention offers several advantages. First, the modular design allows two, three, or even more modular electronic devices to be ganged together in axial alignment for actuation by a common shaft, or by a pair of concentric shafts. The modular design allows each module to have a separate type of electronic device, among a wide variety. For example, the switch module may contain a momentary contact push-button switch, a maintained contact push-button switch, or a rotary switch. The tandem mounting of the modules in coaxial alignment effects substantial space savings. The use of parallel bus bars allows two or more of the electronic components to share a common output line or termination feature, thereby reducing the number of interconnections between circuit components.

Although the present invention has been described above in a preferred embodiment, it will be clear from the foregoing discussion that numerous variations and modifications will suggest themselves to those skilled in the pertinent arts. Such variations and modifications should be considered within the spirit and scope of the present invention, as defined in the claims that follow.

We claim:

1. A modular electrical encoder and switch assembly, comprising:
   a first module containing an electrical encoder, the first module having top, bottom, and side surfaces;
   a second module containing a switch, the second module having top, bottom, and side surfaces;
   bracket means for joining the first and second modules together in tandem, with the top surface of the second module adjacent to the bottom surface of the first module;
   shaft means passing through the first module and extending outwardly from the top surface thereof, and operatively connected to the encoder, the shaft means being rotatable about its axis to operate the encoder, and movable axially between first and second axial positions, the shaft means operatively engaging the switch when moved to the second axial position; and
   spring means captured between the first and second modules and having a resilient portion engageable by the shaft means for allowing the shaft means operatively to engage the switch in the second axial position, and for resiliently returning the shaft means to the first axial position.

2. The assembly of claim 1, wherein the shaft means is rotatable to operate the encoder in both the first and second axial positions.

3. The assembly of claim 1, further comprising:
   a first bus bar extending from a side surface of the first module; and
   a second bus bar extending from a side surface of the second module so as to be vertically spaced from, and substantially parallel to, the first bus bar;
   the first and second bus bars each having a plurality of holes, the holes in the second bus bar being vertically aligned with the holes in the first bus bar, each vertically aligned pair of holes adapted to receive a termination pin.

4. The assembly of claim 1, further comprising:
   spring means captured between the first and second modules and having a resilient portion engageable by the shaft means for allowing the shaft means operatively to engage the switch in the second axial position, and for resiliently returning the shaft means to the first axial position.

5. The assembly of claim 1, wherein the shaft means has an outer end extending outwardly from the first module and inner end engaging the resilient portion of the spring means, and an intermediate portion having a peripheral flange engageable with an interior structure within the first module when the shaft means is in the first axial position.

6. The assembly of claim 5, wherein the switch has a push-button for actuation, and wherein the shaft means, when moved to the second axial position, urges the resilient portion of the spring means against the push-button to actuate the switch.

7. The assembly of claim 6, wherein the shaft means is operably connected to the encoder both in the first and second axial positions.

8. The assembly of claim 1, wherein the spring means includes a substantially cruciform leaf spring having a resilient center section forming the resilient portion that engages an inner end of the shaft means.

9. A modular electrical encoder and switch assembly, comprising:
   a first module containing a rotary-action electrical encoder, comprising a rotor, electrical contact fingers on the bottom surface of the rotor, and a substrate with a predetermined pattern of conductive elements fixed thereon to be contacted by the contact fingers as the rotor is rotated, the first module having top, bottom, and side surfaces;
   a second module containing a switch actuated by a push-button, the second module having top, bottom and side surfaces;
   attachment means for joining the first and second modules together in tandem and in axial alignment, with the top surface of the second module adjacent to the bottom surface of the first module; and
   a shaft having an outer end extending outwardly from the top surface of the first module, an inner end extending through the bottom surface of the first module, and an intermediate portion operatively connected to the rotor so that the rotor rotates with the shaft, the shaft being axially movable, with respect to the first and second modules and the rotor, between first and second axial positions; and
   spring means, engageable with the inner end of the shaft, for resiliently biasing the shaft toward the first axial position;
   whereby the shaft is rotatable to rotate the rotor when the shaft is in either the first or second axial positions, and the push-button of the switch is actuated when the shaft is moved axially from the first axial position to the second axial position.

10. The assembly of claim 9, wherein the spring means comprises a leaf spring interposed between the first and second modules, the leaf spring having a resilient center section that engages the inner end of the shaft, the center section being engageable with the push-button by extending through an aperture in the top surface of the second module when the shaft is moved in its second axial position.

11. The assembly of claim 9, further comprising:
    a first bus bar, on a side surface of the first module, and having a first plurality of holes;
    a second bus bar on a side surface of the second module immediately below the side surface of the first module having the first bus bar, the second bus bar being vertically spaced from, and substantially parallel to the first bus bar, the second bus bar having a second plurality of holes vertically aligned with the first plurality of holes, whereby each aligned pair of holes is adapted to receive a termination pin.

12. The assembly of claim 9, wherein the attachment means comprises:
a bracket having a top portion and a pair of opposed, downwardly-depending side portions; and
means on two opposed side surfaces of each of the first and second modules for lockably engaging the side portions of the bracket.

13. The assembly of claim 10, wherein the leaf spring is substantially cruciform in outline, with the center section being an upwardly bowed section defined between a pair of parallel slots traversing an axis defined by a pair of opposed arms.

14. A modular electrical encoder and switch assembly, comprising:
a first module containing an electrical encoder, the first module having top bottom and side surfaces;
a second module containing a switch, the second module having top, bottom, and side surfaces;
bracket means for joining the first and second modules together in tandem, with the top surface of the second module adjacent to the bottom surface of the first module;
shaft means passing through the first module and extending outwardly from the top surface thereof, and operatively connected to the encoder, the shaft means being rotatable about its axis to operate the encoder, and movable axially between first and second axial positions, the shaft means operatively engaging the switch when moved to the second axial position;
a first bus bar extending from a side surface of the first module; and
a second bus bar extending from a side surface of the second module so as to be vertically spaced from, and substantially parallel to, the first bus bar;
the first and second bus bars each having a plurality of holes, the holes in the second bus bar being vertically aligned with the holes in the first bus bar, each vertically aligned pair of holes adapted to receive a termination pin.

* * * * *

UNITED STATES PATENT AND TRADEMARK OFFICE
CERTIFICATE OF CORRECTION

PATENT NO. : 4,866,219

DATED : September 12, 1989

INVENTOR(S) : Kim Riding, et. 'al.

It is certified that error appears in the above-identified patent and that said Letters Patent is hereby corrected as shown below:

Column 5, Line 62, "The assembly of Claim 1" should read -- The assembly of Claim 14 -- .

Signed and Sealed this

Thirteenth Day of November, 1990

Attest:

HARRY F. MANBECK, JR.

*Attesting Officer*  *Commissioner of Patents and Trademarks*